June 25, 1940.   D. R. MATTOON   2,205,819
HANDLE FOR COOKING UTENSILS
Filed Oct. 22, 1937
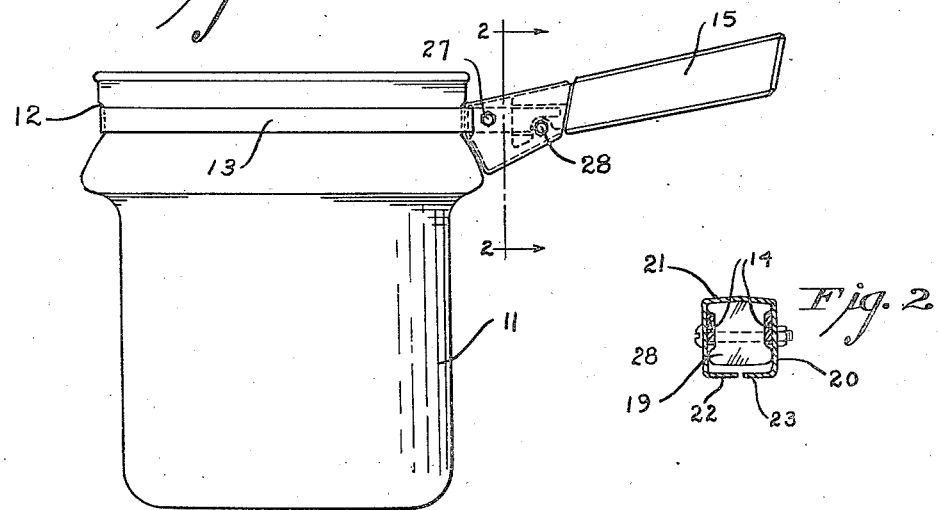
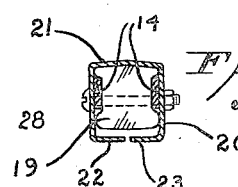
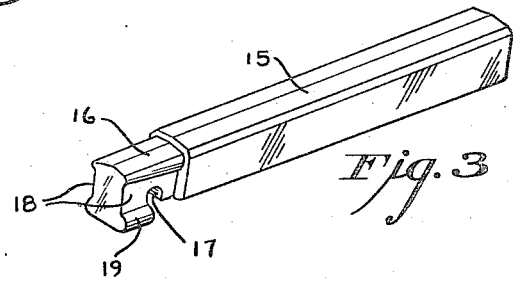
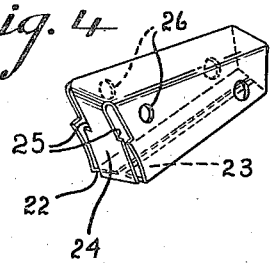
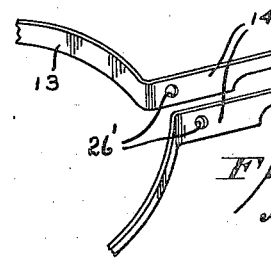
INVENTOR.
DEO R. MATTOON
BY Dorsey, Cole & Farner
ATTORNEYS.

Patented June 25, 1940

2,205,819

UNITED STATES PATENT OFFICE 2,205,819

HANDLE FOR COOKING UTENSILS

Deo E. Mattoon, Corning, N. Y., assignor to Corning Glass Works, Corning, N. Y., a corporation of New York Application October 22, 1937, Serial No. 170,473

2 Claims. (Cl. 16—116)

This invention relates to handles for cooking vessels and more particularly to a handle which may be attached to non-metallic vessels such as glass, earthenware and the like.

The object of the invention is an improved handle having extreme durability and low heat conductivity.

A further object of the invention is an improved mounting by which the handle is firmly attached to the vessel with which it cooperates.

Such a handle and mounting are shown in the accompanying drawing in which:

Fig. 1 is an elevation of the handle and mounting assembled upon a vessel;

Fig. 2 is a section thru the mounting and handle taken on line 2—2 of Fig. 1;

Fig. 3 is a perspective view of the handle;

Fig. 4 is a perspective view of the clamp; and

Fig. 5 is a perspective view of the ends of the supporting strap.

For purposes of illustration, the improved handle has been shown mounted upon a glass cooking vessel designed for use on the top of a stove although obviously such a handle may be used advantageously with other articles of glass, earthenware or even metal.

It has long been known that glass is a relatively poor conductor of heat. This property and the fact that it is non-combustible tend to make it an ideal material from which to construct handles for cooking vessels but for the fact that it has relatively little strength in tension. Some glass dishes adapted to contain hot substances, such as tea cups, tea pots, and the like have been provided with glass handles but these have been of the conventional curved form fused to the body of the article both at the top and at the bottom and are subjected to only relatively slight tensile stresses.

The ideal handle for utensils to be used over open flames or similar heat sources is a straight member extending outwardly and preferably slightly upwardly away from the flame and attached to the vessel at some elevated point on its side wall. While such a handle is most convenient and is least exposed to heat either by conduction or by radiation, it is subjected to bending stresses when in use which have heretofore been considered too severe for glass to withstand. It has been found, however, that if a molded glass handle be cooled rapidly from its softening temperature to a temperature somewhat below its strain point, a condition of strain is set up in the glass which results in considerable compressive stress in the surface glass and tensional stress in the interior of the body. When such a body is subjected to bending movements, the tension set up in the surface opposite the fulcrum must first overcome the compressive stress existing therein before developing any tension in glass. Thus, a tempered glass body can withstand bending movements of many times the value which would fracture similar annealed glass bodies.

By tempering glass as described above, a molded glass handle of moderate dimensions may be given ample strength to withstand the stresses encountered in lifting full cooking utensils, and the thermal and mechanical shocks which such utensils encounter in normal service. In actual practice, it is possible to temper the glass to such an extent to fully compensate for many times the tensile stress set up in the handle due to lifting the container and its normal contents. Once produced, the problem still remains of attaching such a handle to the utensils. Tempered glass cannot be reheated to the softening point without losing the desirable strain which has been induced therein so it is impossible to stick such a handle to a glass utensil. Neither can tempered glass be ground or drilled after tempering for if the compression layer is cut thru, the object immediately breaks. Such cavities and projections as are desired in the handle for mounting purposes must be placed there during the molding of the handle and their extent is limited by accepted molding technique.

The structure of the present invention has been found to be particularly strong and well adapted to make use of an elongate tempered glass handle. The cooking utensil 11 is so molded as to provide a shallow groove 12 in its outer surface adjacent the rim of the utensil. A metal strap 13 encircles the utensil in this groove and terminates in a pair of parallel lugs 14 which extend outwardly, substantially at right angles to the surface of the utensil. The tempered handle 15 terminates in a reduced end 16 which includes a notch 17 cut deeply into the lower surface. Channels 18 are molded into the side walls of end 16 to approximately the thickness of the strap lugs 14 leaving shoulders 19 which extend outwardly above and beneath the lugs.

A sheet metal clamp is provided to enclose lugs 14 and handle end 16 and hold them rigidly in cooperating relationship. This clamp is stamped from a single piece of metal in such manner as to form a pair of side walls 20 and an integral connecting top web 21. Flanges 22 and 23 on the side walls close the bottom of the clamp while a tongue 24 extending from one end of the top member closes the end of the clamp adjacent the utensil. The edges of this tongue are notched at 25 to provide openings thru which lugs 14 may extend into the body of the clamp. Holes 26 in the side walls 20 are in register with corresponding holes 26' in the lugs 14. The clamp member as a whole is contoured to conform substantially to the surface of the handle end 16 and to the surface of the utensil which it abuts.

When the various parts are assembled, the end of the handle fits snugly within the clamp and is held there by a bolt 28 which passes thru the clamp and engages in the notch 17 on the lower side of the handle. Lugs 14 of the strap pass thru notches in the clamp and fit into the channels 18 in either side of the handle as shown in Fig. 2. The clamping action of walls 20 drawn together by bolt 28 is sufficient to prevent movement of lugs 14 with respect to the handle while bolt 27 passing thru holes 26 and 26' rigidly secures the strap to the clamping member and tends to clamp lugs 14 against the sides of the handle. It will be noted that this arrangement of parts results in the application of lifting force to the clamping member by contact of the end 16 with web 21 and also to the ends of the strap which encircles the utensil thru the action of shoulders 19 on lugs 14. Such a structure is usually rigid and the distortion of parts in service is reduced to a minimum.

I claim:

1. In a handle structure for a cooking utensil, a glass body forming a grip portion, said glass body having in its surface layers a permanent condition of compressive stress sufficiently high to compensate for the tensile stress induced therein in lifting the utensil and its contents.

2. In a household utensil in combination a hollow body portion and a straight glass handle attached thereto, said glass handle having in its surface layers a permanent condition of compressive stress sufficiently high to compensate for the tensile stress induced therein in lifting the body portion of the utensil and its contents.

DEO R. MATTOON.